Patented May 7, 1929.

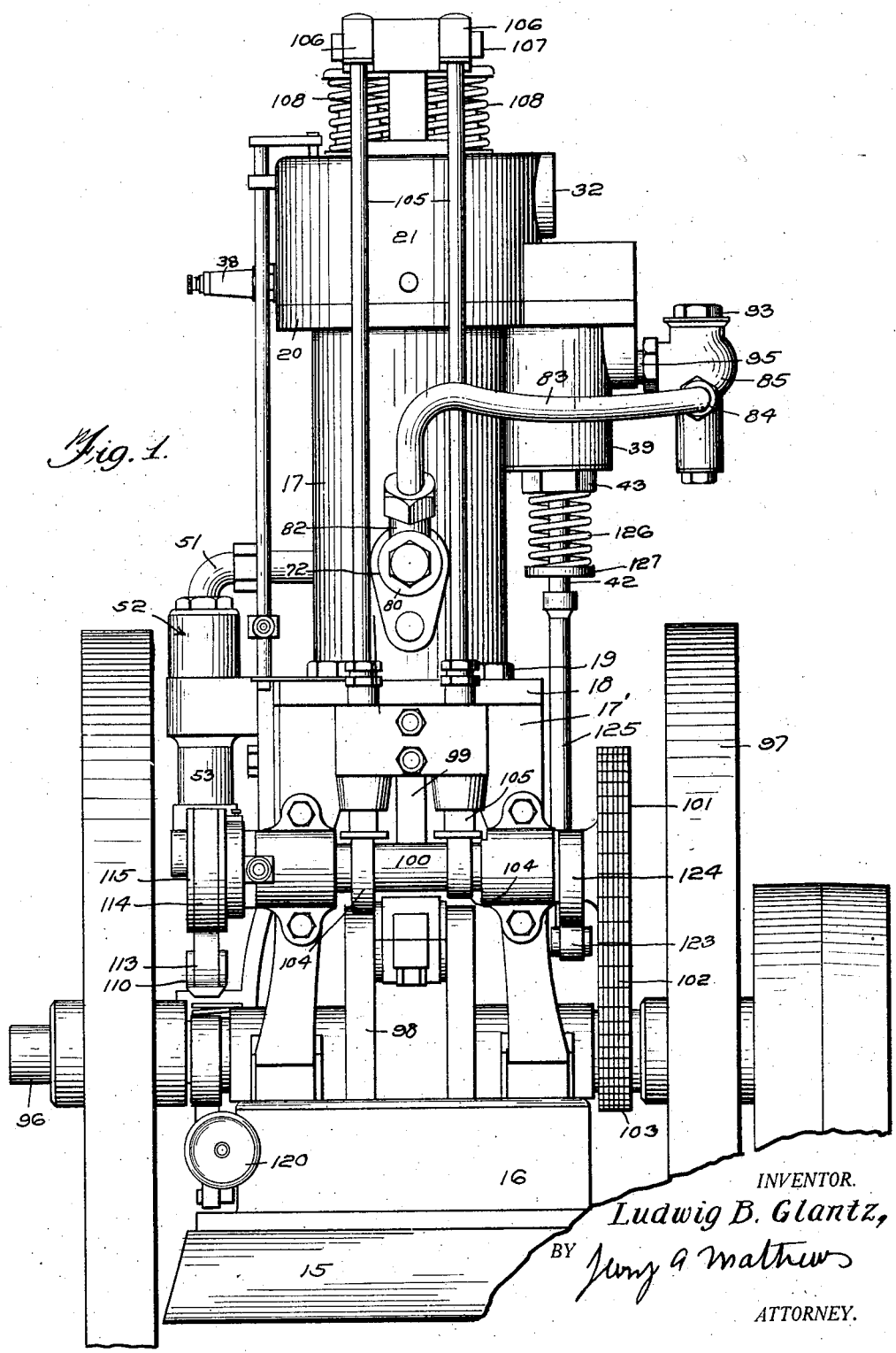

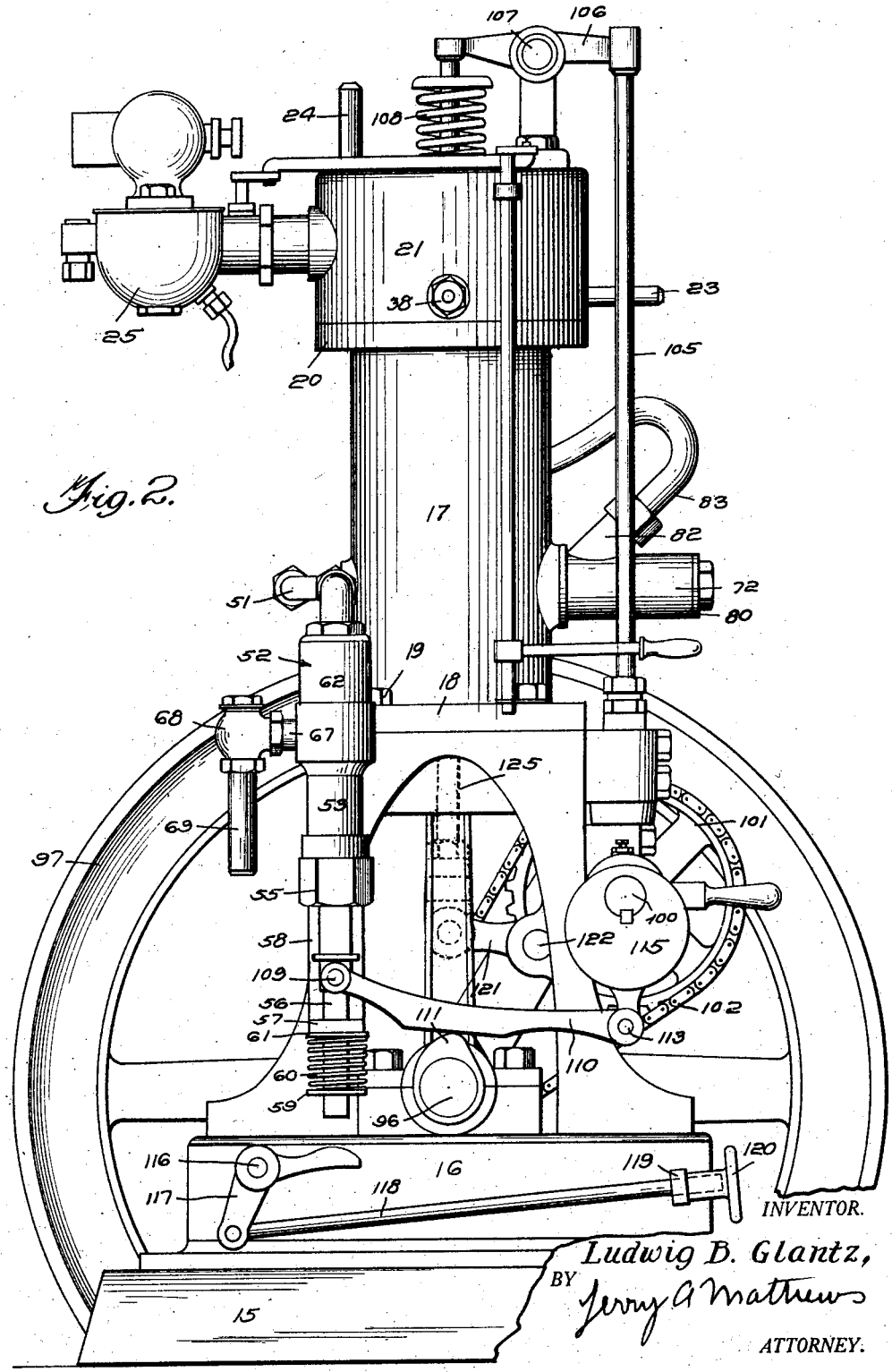

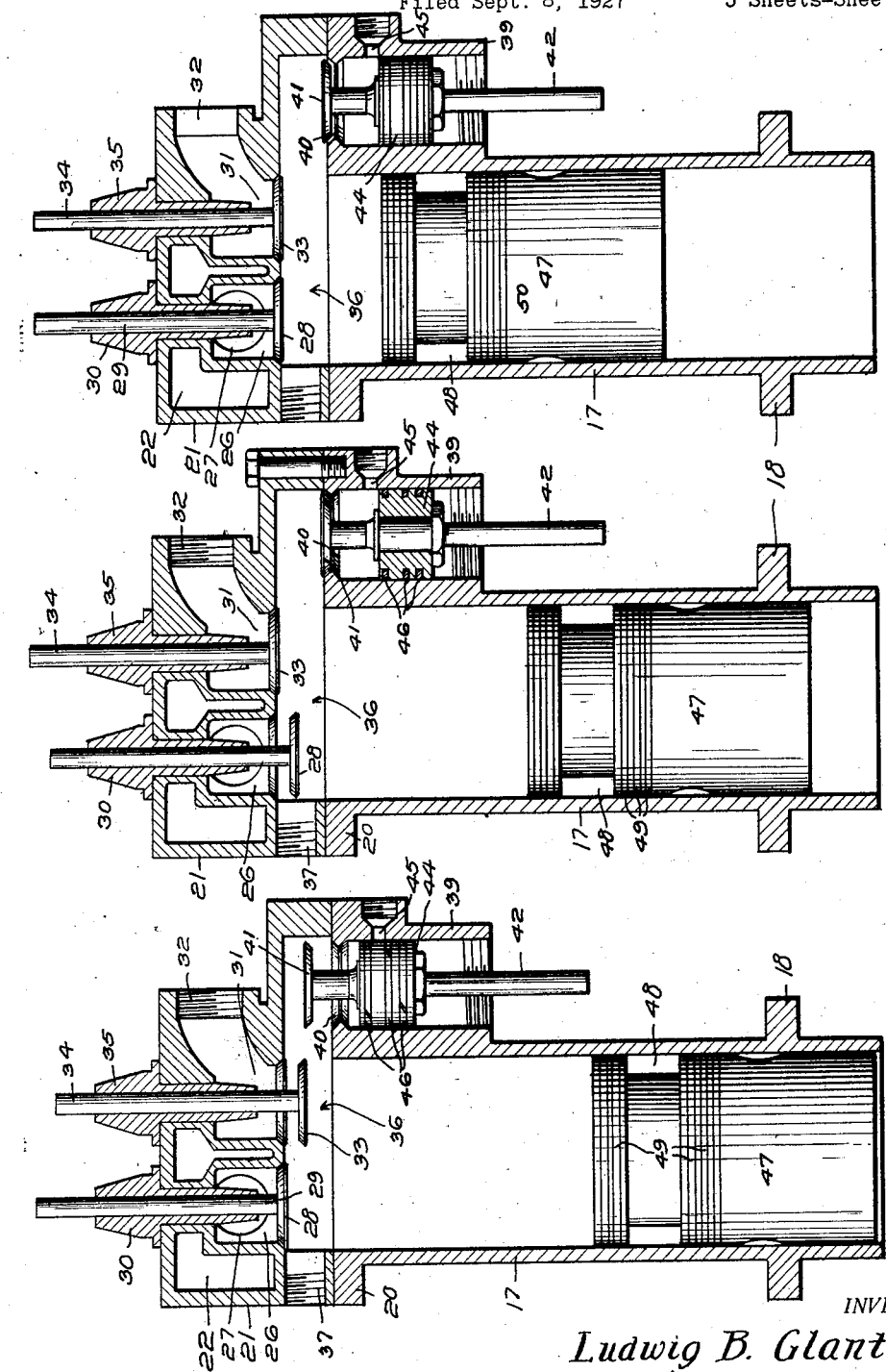

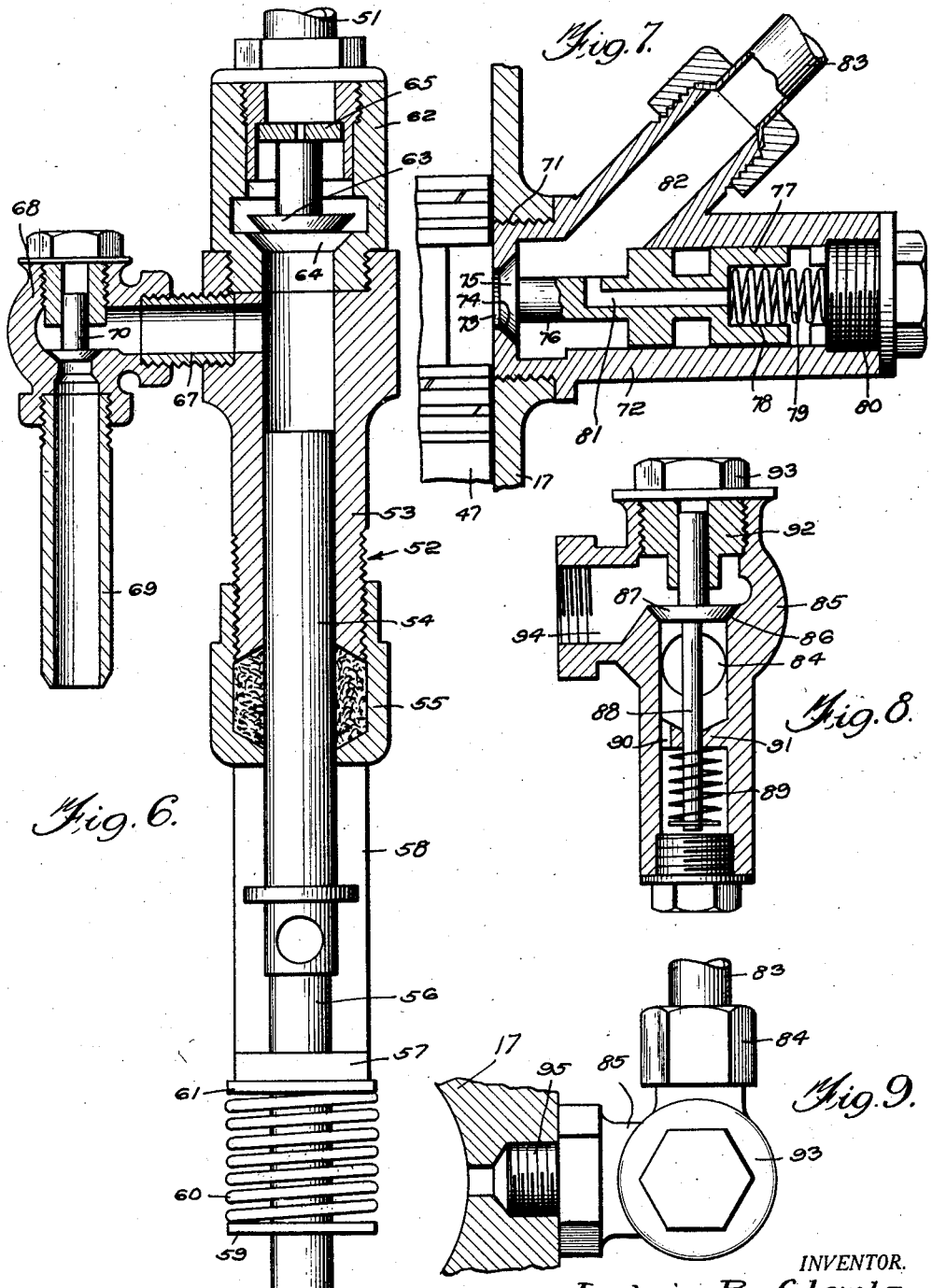

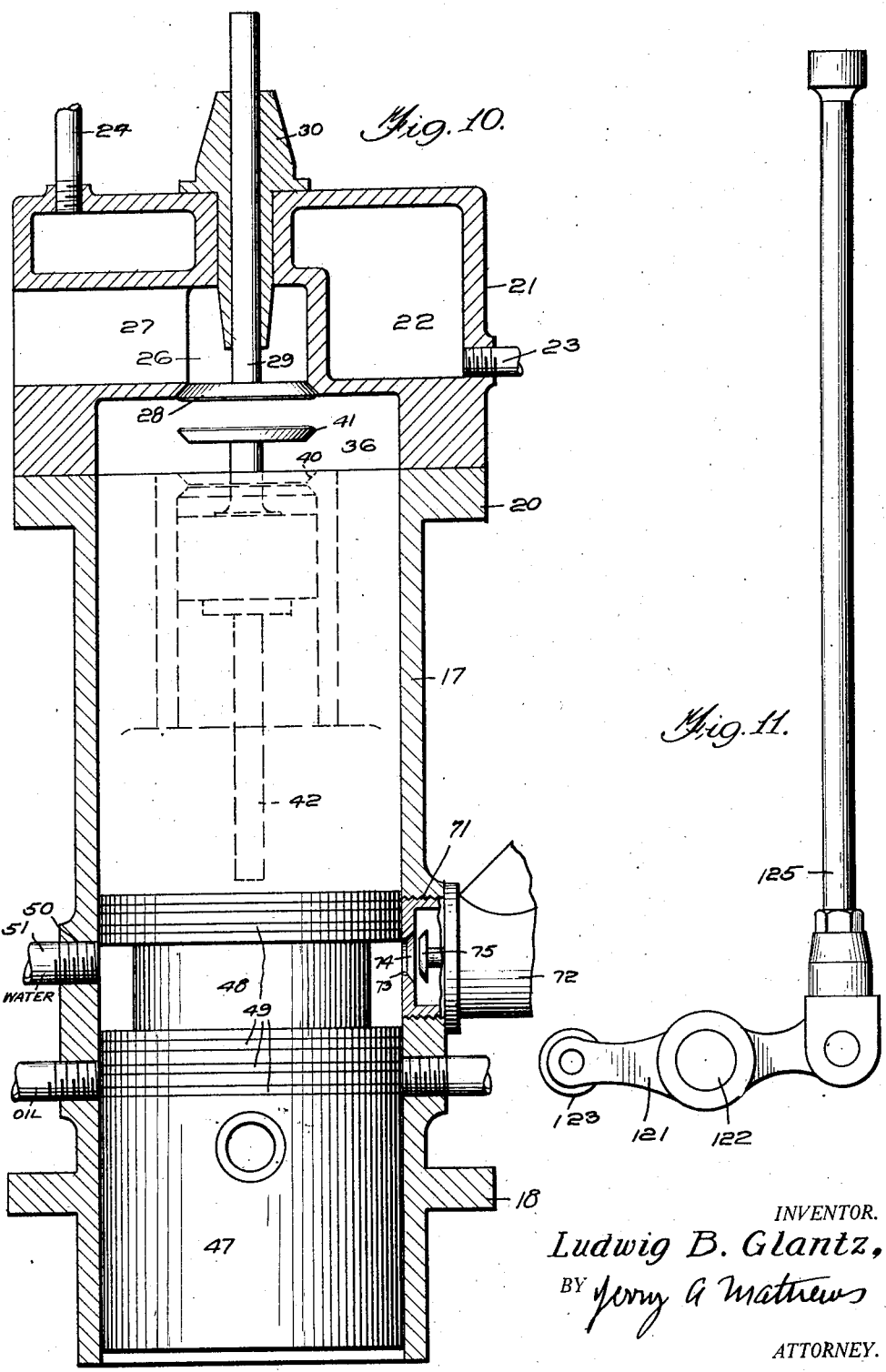

1,711,937

UNITED STATES PATENT OFFICE.

LUDWIG B. GLANTZ, OF MINDEN, NEBRASKA.

INTERNAL-COMBUSTION ENGINE.

Application filed September 8, 1927. Serial No. 218,304.

My invention relates to improvements in internal combustion engines.

In accordance with my invention, I provide an internal combustion engine having a cylinder free from the ordinary water jacket. The cylinder and piston are properly cooled by means of water introduced into the cylinder, at intervals, such water absorbing the heat from the piston and cylinder, thereby regulating the temperature of these parts. The water thus introduced into the cylinder and after absorbing the heat is introduced into the combustion chamber, and mingles with the heated gases or products of combustion in the combustion chamber, is converted into steam, and aids in producing a more effective combustion charge, and also aids in driving the piston upon its power stroke due to the expansion force of the steam.

In the accompanying drawings, forming a part of this specification, and in which like numerals are employed to designate like parts throughout the same.

Figure 1 is a side elevation of an internal combustion engine embodying my invention, at the beginning of the power stroke, Figure 2 is an edge elevation of the same with the piston at the bottom of the power stroke, Figure 3 is a central vertical sectional view of the cylinder and associated elements, showing the piston in the lowermost position at the starting of the exhaust stroke, Figure 4 is a similar view, showing the piston traveling downwardly upon the intake stroke, Figure 5 is a similar view showing the piston traveling downwardly upon the power stroke, Figure 6 is a central vertical longitudinal section through the water pump, Figure 7 is a similar view through the receiving valve device, Figure 8 is a similar view through the inlet valve device, Figure 9 is a plan view of the same, Figure 10 is a central vertical section through the cylinder, a right angle to Figure 3, and, Figure 11 is a side elevation of a rocker arm.

In the drawings, wherein for the purpose of illustration, is shown a preferred embodiment of my invention, the numeral 15 designates a base upon which is mounted a crank casing 16, having a stanchion rigidly mounted thereon. The numeral 17 designates a vertically arranged cylinder, free from the usual water jacket. The cylinder is provided at its lower end with a flange 18, bolted at 19, to the top of the stanchion. At its upper end, the cylinder 17 has a flange 20 engaging a cylinder head 21, which is rigidly secured thereto. This cylinder head is provided with a water space 22 and water is supplied to the space 22 through an intake 23 and discharged therefrom through an outlet 24, although any suitable form of water circulating means may be employed.

The numeral 25 designates a carburetor of any well known or preferred type, which leads into a chamber 26 formed in the head 21, at the point 27. This chamber is adapted to be closed at the bottom by an intake valve 28, seating upwardly, and carried by a valve stem 29, slidable within a guide 30. The head 21 is provided with an exhaust chamber 31, having a screw-threaded end 32, for connection with an exhaust pipe. The exhaust chamber 31 is covered or closed at its bottom by an upwardly seating exhaust valve 33, carried by a vertical stem 34, sliding in a guide 35, as shown. The head 21 is provided beneath the valves 28 and 33 with a chamber 36, which with the top of the cylinder 17, constitutes the combustion chamber. The head 21 is provided with a screw-threaded opening 37, for the reception of a spark plug 38, as shown.

Preferably formed integral with one side of the cylinder 17 adjacent to its upper end is a steam supply cylinder 39, the top end of which engages with the bottom of the head 21, and forms a gas-tight joint therewith. The top end of the steam supply cylinder 39 is provided with a valve seat 40, to be engaged by a downwardly seating valve 41, carried by a rod 42, the lower end of which is slidable through a nut 43, screw-threaded in the lower end of the steam supply cylinder 39. Rigidly mounted upon the rod 42 is a valve-piston 44, slidable within the cylinder 39, serving as a guide for the rod 42, and adapted to cover and uncover an opening or port 45 in the cylinder 39. The valve piston is equipped with suitable packing 46, as shown.

Mounted to reciprocate within the cylinder 17 is a piston 47, which is preferably hollow. This piston is provided with an exterior annular recess or chamber 48, and has packing 49, above and below the same. The cylinder 17 is equipped with a screw-threaded water intake 50, for connection with a pipe 51, which leads to the discharge end of a water pump 52, which is held stationary upon the stanchion 17', by any suitable means.

The water pump is shown in detail in Figure 6, and embodies a vertical cylinder 53, within which is slidable a plunger 54 operating through a stuffing box 55. This plunger extends outwardly beyond the stuffing box 55 and is connected with a rod 56 slidable within an apertured guide 57, carried by a stationary arm 58, rigidly attached to the cylinder 53. A washer 59 is rigidly attached to the rod 56, and is urged downwardly by a compressible coil spring 60 engaging the washer 61, in turn engaging the stationary guide 57. The spring 60 serves to move the plunger 54 downwardly, as is obvious. Having screw-threaded engagement with the top of the cylinder 53 is a casing 62, included in a check valve device. Within this casing is a downwardly seating gravity actuated check valve element 63, adapted to engage a seat 64. The valve 63 has connection at its top with a guide spider 65. The pipe 51 leads into the top of the casing 62, and it will be readily seen that water within the cylinder 53, upon the up stroke of the plunger 54, will unseat the check valve element 63 and travel upwardly about the same into and through the pipe 51 to the inlet opening 50. The cylinder 53 is provided in its side with a screw-threaded opening for receiving a coupling 67, engaging within one end of a casing 68 of an inlet check valve device. The intake of this casing is connected with a water supply pipe 69, and a downwardly seating gravity operating check valve element 70 controls the passage of the water into the casing 68. Upon the down stroke of the plunger 54 the check valve element 70 will open and check valve element 63 close, and upon the up stroke of the plunger 54 check valve element 70 closes and check valve element 63 opens.

The cylinder 17 is provided at the elevation of the water inlet opening 50 with a discharge opening 71, screw-threaded for receiving the screw-threaded end of a casing 72, of a receiving valve device. The inner end of this casing has an opening 73 surrounded by a valve seat 74 and adapted to be engaged by a valve element 75. This valve element is carried by a stem 76, carried by a plunger 77, slidable in the casing 72. The plunger is provided at its outer end with a recess 78, receiving a compressible coil spring 79, engaging a plug or head 80. The stem 76 has a pressure equalizing port 81, formed therein, passing through its side, and leading into recess 78. The casing 72 has a branch 82, connected with a pipe 83. This pipe, see Figures 8 and 9, leads, as shown at 84, into the casing 85 of a second receiving valve device. This casing has a valve seat 86, to be engaged by a downwardly seating valve 87, carried by a stem 88, moved downwardly by a compressible coil spring 89. The numeral 90 designates a pressure equalizing port. The valve stem 88 slides within an apertured guide 91 and a guide 92, carried by a cap 93. The outlet 94 of the casing 85 is connected with the port 45 by means of a pipe 95.

The numeral 96 designates the crank shaft of the engine, equipped with fly wheels 97, and having the usual crank 98 connected with a pitman 99, pivoted to the piston 47.

Rotatably mounted upon the stanchion 17' is a horizontal transverse cam shaft 100, driven by a sprocket wheel 101, engaged by a chain 102, engaging a sprocket wheel 103, driven by the crank shaft 96. The cam shaft 100 carries cams 104, arranged to actuate tappet rods 105, extending upwardly, to actuate rocker arms 106, pivoted at 107, and disposed to depress the valve stems 29 and 34, and these valve stems are moved upwardly by springs 108.

As explained, the shaft 56 which operates the pump plunger 54 is moved downwardly by the compressible coil spring 60 and the shaft 56 has pivotal connection at 109, with an actuating lever 110, arranged above a cam 111, rigidly mounted upon the crank shaft 96. The actuating lever is pivoted at 113, with an annular eccentric strap 114, pivoted upon a circular concentric wheel 115, rigid upon the cam shaft 100. When the cam strap 114 is in the lowermost position, the cam 111 may engage and elevate the forward end of the actuating lever 110, but when the eccentric strap 114 is in the uppermost position, the actuating lever 110 will be raised above the cam 111, and will clear the same. Pivoted at 116 is a bell crank lever 117, having its upper arm in the path of travel of the shaft or rod 56. The lower end of this bell crank lever is pivotally connected with a rod 118 and the rear end of this rod is slidable within a stationary apertured lug 119, and has screw-threaded engagement rearwardly beyond the same with a hand wheel 120. By turning the hand wheel 120, the upper arm of the bell crank lever 117 may be raised and lowered and since this arm is in the path of travel of the shaft 56, it will limit the downward movement of the shaft 56, and hence the down stroke of the pump plunger.

The numeral 121 designates a rocker arm, pivoted at 122, to swing in a vertical plane. The rear end of the rocker arm is equipped with a roller 123 arranged to engage beneath a cam 124, rigidly mounted upon the cam shaft 100. The forward end of the rocker arm 121 has pivotal connection with a vertical rod 125, extending upwardly for connection with the piston valve rod 42. The piston valve rod 42 is moved downwardly by a compressible coil spring 126, engaging a collar 127, fixed thereon, as shown.

The operation of the engine is as follows:

Upon the beginning of the down intake stroke, Figure 4, the intake valve 28 opens, and the explosive charge is fed into the cylinder, and the piston continues to travel downwardly, as shown. The exhaust valve 33 is now closed and valve 41 is seated while piston valve 44 is in the lower position, to uncover the port 45. When the piston 47 reaches the end of the intake down stroke, the eccentric element 115, Figure 2, is in the raised position, and the lever 110 is in the elevated position, out of the path of travel of the cam 111, which is now in the raised position. Hence the pump 52 is not actuated upon the intake down stroke. Upon the up compression stroke, the inlet valve 28 closes and the exhaust valve 33 remains closed, and the valve 41 remains seated and piston valve 44 remains in the same position, as shown, in Figure 4. The charge is, therefore, compressed and is ignited in the usual manner to drive the piston upon the down power stroke. Upon the compression up stroke of the piston the eccentric element 115 is in the horizontal position. When the piston 47 moves downwardly upon the power stroke, Figure 5, for the distance of about 45°, the valve 41 begins to open and is completely opened when the piston has moved downwardly for about 90° and remains thus opened throughout the complete power down stroke and also remains open upon about one-half of the up exhaust stroke of the piston but closes when the piston has reached this point. The introduction of the water or steam into the cylinder during the down power stroke, results in the evaporation of the water or steam, which increases the power of the engine. Upon the down power stroke of the piston 47, the eccentric element 115 is in the lowered position and the lever 110 is also lowered and is in the path of travel of the cam 111, and hence will be raised by the cam 111 which assumes the upper position upon the power down stroke, thereby actuating the pump 52 and forcing water through the pipe 51, into the annular recess 48. Since the port 45 is now covered by the piston valve 44, the water is retained within the recess 48, and thereby absorbs heat from the products of combustion, during the power stroke and is wholly or partly converted into steam. When the piston starts upon the up exhaust stroke, inlet valve 28 remains seated, while exhaust valve 33 opens and the products of combustion discharge from the cylinder with the steam, which has been previously introduced into the cylinder 17. The valve 41 remains open until the piston 47 travels upwardly upon the exhaust stroke for about one-half of its distance, at which time the valve 41 will again close and piston valve 44 uncover port 45, as stated. When the piston 47 reaches the top of its exhaust stroke, the exhaust valve 33 closes and intake valve 28 opens, and the cycle is repeated. When the piston 47 reaches the bottom of its down intake stroke, the recess 48 is brought into alignment with opening 73, and the steam or vaporized water will now pass through the conduit 83 and associated elements and through the port 45 into the cylinder 39 above the piston valve 44, and be held therein, until the valve 41 again opens.

It is to be understood that the form of my invention, herewith shown and described, is to be taken as a preferred example of the same, and that various changes in the shape, size and arrangement of parts may be resorted to without departing from the spirits of my invention, or the scope of the subjoined claims.

Having thus described my invention, I claim:

1. In an internal combustion engine, a main cylinder, intake and exhaust valves at one end thereof, a working piston to reciprocate within the main cylinder and provided upon its periphery with a water receiving recess, means to supply water to said recess, and means for controlling the passage of the vaporized water from within the recess to the cylinder.

2. In an internal combustion engine, a main cylinder, intake and exhaust valves arranged near one end thereof, a working piston to reciprocate within the main cylinder and provided upon its periphery with a water receiving recess, a pump to supply water to the recess and driven by a movable part of the engine, and means for controlling the passage of the vaporized water from the recess to the cylinder.

3. In an internal combustion engine, a main cylinder, intake and exhaust valves arranged near one end thereof, a working piston to reciprocate within the main cylinder and provided upon its periphery with a water receiving recess, a crank shaft driven by the piston, a pump to supply water to the recess, an actuating element serving to operate the pump, a cam driven by the crank shaft and adapted to move the actuating element, automatic means to move the actuating element so that it can not be shifted by the cam, and means for controlling the passage of the vaporized water from the recess to the cylinder.

4. In an internal combustion engine, a main cylinder, intake and exhaust valves arranged near one end thereof, a working piston to reciprocate within the main cylinder and provided upon its periphery with a water receiving recess, a crank shaft driven by the piston, a pump to supply water to the recess and embodying a movable element, a spring to move said element in one direction, an arm pivoted to said element, a cam driven by the crank shaft and arranged to engage and shift the arm when the arm is in the lower position, eccentric means driven by the crank shaft and connected with said arm and adapted to raise the same, and means for controlling the passage of the vaporized water from the recess to the cylinder.

5. In an internal combustion engine, a main cylinder, intake and exhaust valves for the same, a working piston to reciprocate within the main cylinder and provided upon its periphery with a water receiving recess, a crank shaft driven by the piston, a pump to supply water to the recess and embodying a movable element, a spring to move the element in one direction, adjustable means arranged in the path of travel of the movable element to regulate its extent of movement by the spring, an arm pivoted to said element, a cam driven by the crank shaft and arranged to engage and shift the arm when it is in the lower position, eccentric means driven by the crank shaft and connected with the arm and adapted to raise the same, and means for controlling the passage of the vaporized water from the recess to the cylinder.

6. In an internal combustion engine, a cylinder, intake and exhaust valves arranged near one end thereof, a steam supply cylinder having communication with the power cylinder and provided in its side with an inlet port, a valve for controlling said means of communication, a piston valve to reciprocate within the steam supply cylinder to cover and uncover the inlet port and connected with the last named valve to move therewith, means to move the piston valve, a piston to reciprocate within the power cylinder and having a water receiving recess upon its periphery, a pump to supply water to said recess, means to supply vaporized water from the recess to the inlet port of the steam supply cylinder, and means to drive the pump.

7. In an internal combustion engine, a cylinder, intake and exhaust valves arranged near one end of the same, a piston to reciprocate within the cylinder and provided upon its periphery with a water receiving recess, a water supply pump leading into the cylinder to supply water to said recess, a check valve control conduit leading into the cylinder at substantially the elevation of the outlet of the pump to receive vaporized water from the recess, a steam supply cylinder having an opening leading into the end of the main cylinder and provided in its side with an intake port, a check valve device connecting the intake port and said conduit, a valve adapted to cover and uncover said opening, a piston valve to reciprocate within the steam supply cylinder to cover and uncover said inlet, a rod connecting the valve and piston valve, and means to move said rod.

8. In an internal combustion engine, a cylinder, intake and exhaust valves for the same, a piston to reciprocate within the cylinder and provided upon its periphery with a water receiving recess, a crank shaft driven by the piston, a pump having a check valve control outlet leading into the cylinder to supply water to the recess and embodying a reciprocatory element, a spring to move the element in one direction, an arm pivoted to said element, a cam driven by the crank shaft and arranged to engage the arm when it is in the lower position, eccentric means driven by the crank shaft and connected with the arm and adapted to raise the same, a check valve control conduit leading into the cylinder at substantially the elevation of the outlet of the pump to receive the vaporized water from the recess, a steam supply cylinder having an opening leading into the end of the main cylinder and provided in its side with an intake port, a check valve device connecting the intake port and the conduit, a valve to cover and uncover said opening, a piston valve to reciprocate within the steam supply cylinder to cover and uncover the inlet port, a rod connecting the valve and piston valve, and means to move the rod.

In testimony whereof I affix my signature.

LUDWIG B. GLANTZ.